(12) United States Patent
Poloso et al.

(10) Patent No.: US 7,183,005 B2
(45) Date of Patent: Feb. 27, 2007

(54) IMPACT STRENGTH IMPROVEMENT OF REGRIND

(75) Inventors: Anthony Poloso, Praireville, LA (US); Allen T Mika, Baton Rouge, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/923,180

(22) Filed: Aug. 20, 2004

(65) Prior Publication Data

US 2006/0040121 A1    Feb. 23, 2006

(51) Int. Cl.
*B32B 27/32* (2006.01)
*B32B 27/34* (2006.01)
*B32B 27/36* (2006.01)
*B32B 27/06* (2006.01)
*B32B 27/08* (2006.01)

(52) U.S. Cl. ............... 428/474.4; 428/34.1; 428/35.7; 428/35.9; 428/475.5; 428/475.8; 428/476.1; 428/476.3; 428/476.9; 428/483; 428/515; 428/516; 428/523; 428/903.3

(58) Field of Classification Search ............. 428/474.4, 428/475.5, 475.8, 476.1, 476.3, 476.9, 483, 428/515, 516, 523, 903.3, 34.1, 35.7, 35.9
See application file for complete search history.

(56) References Cited

U.S. PATENT DOCUMENTS

| | | | |
|---|---|---|---|
| 4,808,561 A | 2/1989 | Welborn, Jr. | |
| 5,017,714 A | 5/1991 | Welborn, Jr. | |
| 5,055,438 A | 10/1991 | Canich | |
| 5,064,802 A | 11/1991 | Stevens et al. | |
| 5,124,418 A | 6/1992 | Welborn, Jr. | |
| 5,153,157 A | 10/1992 | Hlatky et al. | |
| 5,324,800 A | 6/1994 | Welborn, Jr. et al. | |
| 5,749,202 A | 5/1998 | Eichbauer | |
| 5,752,362 A | 5/1998 | Eichbauer | |
| 5,814,399 A | 9/1998 | Eichbauer | |
| 5,902,684 A | 5/1999 | Bullard et al. | |
| 5,907,942 A | 6/1999 | Eichbauer | |
| 5,907,943 A | 6/1999 | Eichbauer | |
| 6,068,933 A | 5/2000 | Shepard et al. | 428/474.4 |
| 6,223,945 B1 | 5/2001 | Giblin et al. | 222/109 |
| 6,270,867 B1 * | 8/2001 | Eckstein et al. | 428/35.7 |
| 6,376,410 B1 | 4/2002 | Burkhardt et al. | |
| 6,380,122 B1 | 4/2002 | Kuchta et al. | |
| 6,492,010 B1 | 12/2002 | Karaoglu et al. | |
| 6,670,007 B1 | 12/2003 | Safian et al. | 428/36.91 |
| 6,884,450 B2 * | 4/2005 | Wu et al. | 514/405 |
| 2002/0051891 A1 | 5/2002 | Le Roy et al. | 428/475.8 |
| 2002/0086174 A1 | 7/2002 | Genske et al. | |
| 2002/0176955 A1 | 11/2002 | Hayashi et al. | |
| 2003/0175538 A1 | 9/2003 | Yamaguchi et al. | 428/515 |
| 2003/0198768 A1 | 10/2003 | Delbarre | 428/36.6 |
| 2004/0071904 A1 | 4/2004 | Short | 428/35.7 |

FOREIGN PATENT DOCUMENTS

| | | |
|---|---|---|
| CA | 2122283 | 4/1994 |
| EP | 0313066 | 4/1989 |
| EP | 1108586 | 6/2001 |
| EP | 1298168 | 4/2003 |
| WO | WO 1996/11960 | 4/1996 |
| WO | WO 1996/11961 | 4/1996 |
| WO | WO 98029245 A2 | 7/1998 |
| WO | WO 2001/98409 | 12/2001 |
| WO | WO03/000790 | 1/2003 |

OTHER PUBLICATIONS

Extrusion Blow Molding of Clarified Polypropylene Rigid Containers, T.M. Miller, Polyolefins Conference, Houston Feb. 2002.

* cited by examiner

*Primary Examiner*—Ana Woodward

(57) ABSTRACT

Regrind is mixed with at least one low density metallocene polyethylene to increase the amount of regrind that can be used in a thermoformed article.

32 Claims, No Drawings

IMPACT STRENGTH IMPROVEMENT OF REGRIND

FIELD OF THE INVENTION

The invention relates to the addition of low density metallocene polyethylene to regrind material in order to improve impact strength of articles made using the regrind material.

BACKGROUND OF THE INVENTION

Many diverse structures are made of layers that are not compatible when the layers are ground up and used in a regrind layer. For instance, barrier fuel tanks for automobiles typically include at least one layer comprising virgin HDPE, a barrier layer comprising EVOH, polyamide (e.g., nylon), and the like, a layer comprising regrind material, and several adhesive or tie layers to bind the other layers. See, for instance, U.S. Application No. 2004/0071904.

A large amount of trim material is typically generated when producing barrier fuel tanks by blow molding or thermoforming methods. In order to make such processes more economical the trim is reused in the process in the regrind layer. However, as the regrind layer has poor impact strength, the amount of regrind that can be used in the final structure is limited.

In current commercial operations, only about 35 wt. % regrind (based on the weight of the entire automotive fuel tank) can be incorporated into a new tank if the tank is to possess certain desirable characteristics, such as passing the cold drop (−40° C.) test. The trim in current blow molding or thermoforming operations can run as high as 60 wt. % of the weight of the fuel tank, and thus there is the problem of an excess of trim, which must then be sold as scrap.

The poor mechanical strength of regrind relative to the polyethylene layer has been addressed in the prior art by various methods, e.g., rearranging the order of layers (see, for instance, paragraph [0148] of U.S. Patent Application 2002/0176955A1) or providing a new adhesive material (see, for instance, U.S. Patent Application 2003/0175538). As multilayer structures comprise more and more diverse materials (see, for instance, EP 1108586, teaching an automotive fuel tank having a second barrier layer of amorphous carbon), the problem of the disposition of trim and other scrap material grows. It would be beneficial if a higher amount of trim could be used in the process that generates the trim, without detracting from the important properties of the final product.

U.S. Pat. No. 6,223,945 discloses a bottle resistant to stress crack comprising a multilayer resin structure having an inner layer including a metallocene polyethylene, an optional middle layer comprising post-consumer recycled resin (PCR), such as HDPE bottle scrap or LLDPE recycled pallet stretch film, and an outer layer comprising a higher density material.

U.S. Patent Application No. 2002/0086174 teaches multilayer film structures having improved seal and tear properties having a layer comprising regrind and a polyethylene having a density of from about 0.93 g/cc to about 0.97 g/cc.

WO 03/000790 A1 teaches the use of VLDPE or LLDPE polyethylene as impact modifiers for polypropylene.

EP 0622183 describes a multilayer film having a layer comprising recycled material and a primer comprising an anhydride modified polyolefin or copolymer.

Additional related references include U.S. Pat. Nos. 6,068,933; and 6,670,007; U.S. Application Nos. 2002/0051891, and 2003/0198768, Canadian Patent Application No. 2,122,283, and WO 98029245 A2.

The present inventors have surprisingly discovered that addition of low density metallocene polyethylenes to regrind allows an increase in the nount of regrind that can be used in a useful article, such as a multilayer structure comprising a regrind layer.

SUMMARY OF THE INVENTION

The invention is directed to the use of low density metallocene polyethylenes in regrind material.

In an embodiment, the addition of the low density metallocene polyethylenes increases at least one of the properties of melt strength of the material, or the impact strength the article made therefrom, relative to the material or article, respectively, without the addition of the low density metallocene polyethylene.

In an embodiment the regrind having added thereto low density metallocene polyethylene is used in a multilayer structure, such as a multilayer film or sheet or a relatively large and complex article such as a tank for holding fuel or other liquids or gases, e.g., a barrier fuel tank. In a preferred embodiment the structure is a thermoformed article. In another preferred embodiment, the structure is a blow molded article.

It is an object of the present invention to provide a method of increasing the amount of scrap material, particularly regrind, in useful articles, particularly in useful articles already utilizing scrap and more particularly regrind.

It is a further object of the invention to provide scrap-containing articles having increased strength characteristics, particularly impact strength.

These and other embodiments, objects, features, and advantages will become apparent as reference is made to the following detailed description, preferred embodiments, examples, and appended claims.

DETAILED DESCRIPTION

According to the invention, at least one low density metallocene polyethylene is added to regrind material.

Various types of polyethylenes are known in the art. For the purposes of the present invention, the following descriptions of polyethylenes apply. Low density polyethylene ("LDPE") can be prepared at high pressure using free radical initiators and typically has a density in the range of 0.916–0.940 g/cm$^3$. LDPE is also known as "branched" or "heterogeneously branched" polyethylene because of the relatively large number of long chain branches extending from the main polymer backbone. Polyethylene in the same density range, i.e., 0.916 to 0.940 g/cm$^3$, which is linear and does not contain large quantities of long chain branching is also known; this "linear low density polyethylene" ("LLDPE") can be produced with conventional Ziegler-Natta catalysts or with single site catalysts, such as metallocene catalysts, discussed further below. Relatively higher density LDPE or LLDPE, typically in the range of 0.928 to 0.940 g/cm$^3$ are sometimes referred to as medium density polyethylene ("MDPE") or Linear Medium Density Polyethylene (LMDPE), respectively. Polyethylenes having still greater density are the high density polyethylenes ("HDPEs"), i.e., polyethylenes having densities greater than 0.940 g/cm$^3$, and are generally prepared with Ziegler-Natta catalysts, chrome catalysts or even single site catalysts such as metallocene catalysts. Very low density polyethylene ("VLDPE") is also known. VLDPEs can be produced by a number of different processes yielding polymers with different properties, but can be generally described as polyethylenes having a density less than 0.916 g/cm$^3$, typically 0.890 to 0.915 g/cm$^3$ or 0.900 to 0.915 g/cm$^3$. VLDPEs produced using metallocene or other single-site catalysts, as discussed further below, are referred to as a type of plastomer. Plastomers having a density as low as 0.860 g/cm$^3$ are commercially available. LLDPE and VLDPE produced using metallocene catalysts which are useful in the present invention are referred to herein as mLLDPE and mVLDPE, respectively.

The present invention is directed to adding at least one low density metallocene polyethylene, wherein the term "low density" means a metallocene LLDPE having a density of about 0.916 g/cc to about 0.940 g/cc or metallocene VLDPE having a density below 0.916 g/cc, preferably a density from about 0.860 g/cc to about 0.915 g/cc. In an embodiment, the low density metallocene polyethylene will have a density of from about 0.860 g/cc to about 0.905 g/cc. In another embodiment, the low density metallocene polyethylene will have a density of from about 0.860 g/cc to less than 0.890 g/cc. Densities as used; herein are measured using ASTM D-1505.

Polyethylene generally may also be characterized as homopolymers or copolymers of ethylene. Polymers having more than two types of monomers, such as terpolymers, are also included within the term "copolymer" as used herein.

The comonomers that are useful in the present invention include alpha-olefins, such as $C_3$–$C_{20}$ alpha-olefin and preferably $C_3$–$C_{12}$ alpha-olefins. The alpha-olefin comonomer can be linear or branched, and two or more comonomers can be used, if desired. Examples of suitable comonomers include linear $C_3$–$C_{12}$ alpha-olefins, and alpha-olefins having one or more $C_1$–$C_3$ alkyl branches, or an aryl group. Specific examples include propylene; 3-methyl-1-butene; 3,3dimethyl-1-butene; 1-pentene; 1-butene; 1-pentene with one or more methyl, ethyl or propyl substituents; 1-hexene; 1-hexene with one or more methyl, ethyl or propyl substituents; 1-heptene with one or more methyl, ethyl or propyl substituents; 1-decene; 1-dodecene; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting.

A "metallocene polyethylene" as used herein means a polyethylene produced by a metallocene catalyst. As used herein, the term "metallocene catalyst" is defined to be at least one metallocene catalyst component containing one or more substituted or unsubstituted cyclopentadienyl moiety (Cp) in combination with a Group 4, 5, or 6 transition metal (M).

The metallocene catalyst precursors generally require activation with a suitable co-catalyst, or activator, in order to yield an "active metallocene catalyst", i.e., an organometallic complex with a vacant coordination site that can coordinate, insert, and polymerize olefins. The active catalyst systems generally includes not only the metallocene complex, but also an activator, such as an alumoxane or a derivative thereof (preferably MAO), an ionizing activator, a Lewis acid, or a combination thereof. Alkylalumoxanes are additionally suitable as catalyst activators The catalyst system is preferably supported or a carrier, typically an inorganic oxide or chloride or a resinous material such as polyethylene.

The prior art is replete with examples of metallocene catalysts/systems for producing polyethylene. Non-limiting examples of metallocene catalysts and catalyst systems useful in practicing the present invention include WO 96/11961; WO 96/11960; U.S. Pat. Nos. 4,808,561; 5,017,714; 5,055,438; 5,064,802; 5,124,418; 5,153,157; 5,324,800; more recent examples are U.S. Pat. Nos. 6,380,122; and 6,376,410; and WO01/98409, and references cited therein.

Included within the definition of the "metallocene polyethylene" useful in the present invention are polyethylene resins having a low polydispersity as described, for instance, in U.S. Pat. No. 6,492,010, that is, a polydispersity produced by a catalyst variously described as "single site", "constrained geometry", or the aforementioned metallocene catalyst, catalysts per se well known in the prior art.

Metallocene or low polydispersity resins useful in the present invention are available from, among others, Dow Chemical Company and Exxon Chemical Company who are producers of single site or constrained geometry catalyzed polyethylenes. These resins are commercially available as the ENHANCED POLYETHYLENE™, ELITE™, AFFINITY™, EXXACT™, and EXCEED™ polyethylene resins. TAFMER™ resins, available from Mitsui Chemical Company and also having low polydispersity, and having a density within the aforementioned range for LLDPE and VLDPEs, are also useful in present invention, and are included within the definition of the term "metallocene polyethylene" for the purposes of the present invention.

Also useful in the present invention and included within the definition of metallocene polyethylenes useful in the present invention are bimodal resins produced by catalysts having as at least one component a metallocene polyethylene. Particularly preferred examples are bimodal resins having as a component a resin produced using a single site, constrained geometry, or metallocene catalyst and having a density falling within the density range for LLDPE and VLDPE as previously described. Bimodal resins are per se well known in the art.

Accordingly, the low density metallocene polyethylene may be selected from metallocene LLDPE (mLLDPE), metallocene VLDPE (mVLDPE), or a mixture thereof. In an embodiment the low density metallocene polyethylene is produced using a metallocene catalyst, a single site catalyst, a constrained geometry catalyst, or it maybe a low polydispersity, low density polyethylene resin, or it may be a mixture of more than one of the aforementioned low density metallocene polyethylenes.

In the case where the metallocene polyethylene is a polyethylene copolymer, the preferred alpha olefin comonomer content is below about 30 weight percent, preferably below about 20 weight percent, and more preferably from about 1 to about 15 weight percent. Preferred comonomers include propylene, 1-butene, 1-pentene, 1-hexene, 3-methyl-1-pentene, 4-methyl-1-pentene, 1-octene, 1-decene, and 1-dodecene.

In an embodiment, the low density metallocene polyethylene is a low polydispersity polyethylene resins, preferably having a number average molecular weight in the range of from about 20,000 to about 500,000, more preferably from about 50,000 to about 200,000. The molecular weight maybe determined by commonly used techniques such as size exclusion chromatography or gel permeation chromatography. As is known in the art, however, molecular weight is typically not an important characteristic by which metallocene polyethylenes are described, but may vary depending on the process in which it is to be used (e.g., thermoforming technique) and the characteristics desired in the end product.

In an embodiment, the polyethylene resin according to the present invention will have a molecular weight distribution, or polydispersity, (Mw/Mn, or MWD) within the range of about 1 to about 4, preferably about 1.5 to about 4, more preferably about 2 to about 4, and even more preferably from about 2 to about 3, as determined by gel permeation chromatography (GPC) using a DRI refraction index detector, i.e., a Waters 150C GPC instrument with DRI detectors. Such products are well known in the art per se and are discussed, for instance, in U.S. Pat. Nos. 5,907,942; 5,907,943; 5,902,684; 5,752,362; 5,814,399; and 5,749,202.

In an embodiment, the low polydispersity polymers this produced generally have a crystalline content in excess of at least 10 weight percent, generally in excess of at least 15 weight percent.

In a more preferred embodiment, useful mLLDPE and mVLDPE resins suitable for the present invention include those sold under the Exact or Exceed trademarks, both available from ExxonMobil Chemical Company, Houston, Tex., USA. Particularly preferred is Exact™ 8201 polyethylene, a 1.0 MI$_2$, 0.882 density plastomer, Exact™ 0201 polyethylene, a 1.1 MI$_2$, 0.902 density resin, and Exceed™ 1012 polyethylene a 1.0 MI$_2$, 0.912 density resin available from ExxonMobil Chemical Company.

The amount of the at least one low density metallocene polyethylene added to the regrind will be, in an embodiment, an amount sufficient to impart increased impact strength in the desired finished article, e.g., barrier fuel tank, as measured by a Gardener Impact Test (ASTM D-5420), which may be measured at, for instance, room temperature or a cold temperature test at −40° C. In another embodiment, the amount of low density metallocene resin added to the regrind layer is about 3 wt. % to about 20 wt. %, or 3 wt. % to about 15 wt. %, based on the weight of the regrind layer.

As used herein, the term "regrind" means the diverse materials, including trim and non-compliant articles, which are typically ground up by conventional size reduction techniques and reused or otherwise recycled (e.g., in the process from which the regrind is generated or into some other process). In an embodiment the regrind is trim or scrap from a thermoforming or other technique involving molding, particularly blow molding. In an embodiment, the regrind has added thereto the low density metallocene polyethylene resin according to the invention and then is used back in the process generating the trim. In an embodiment the regrind is ground to a preselected mesh size. Although the term "regrind" implies grinding of the material, it will be recognized by one of ordinary skill in the art in possession of the present disclosure that the scrap material can simply be thrown into a hopper and melted with the low density metallocene polyethylene according to the invention. The low density metallocene polyethylene resin may be added to the regrind in-line or it may be separately mixed with regrind, extruded into pellets, and then added to the thermoforming or other forming operation making an article utilizing a regrind layer. In an even more preferred embodiment the trim is from a thermoforming process, yet even more preferably such a process making automotive barrier fuel tanks, and the regrind from this trim is used back in the thermoforming process in-line to make an automotive barrier fuel tank. The regrind may also have added thereto known compatibilizers such as anhydride grafted polyethylene, e.g., maleic anhydride grafted polyethylene.

The benefits of the present invention are especially seen in the case where regrind contains material incompatible with polyethylene but it will be recognized by one of ordinary skill in the art that benefits may also be seen with material that consists essentially of one or more polyethylenes. The benefits may also be seen in a single layer film or sheet but more particularly in a multilayer film or sheet, and even more particularly in complex articles, it being understood that the term "article" as used herein also includes a single layer of film.

Material incompatible with polyethylene means in its most general sense material that is more polar than homopolymers of ethylene or copolymers of ethylene and an alpha olefin comonomer, and also includes material that is immiscible with the polyethylene when blended and forms a second phase within the polyethylene matrix or wherein polyethylene forms a second phase within the matrix of said incompatible material. In an embodiment, such materials will be selected from polypropylene, functionalized polyolefins, polyketones, polyesters, polyamides, ethylene vinyl acetates (EVA), ethylene vinyl alcohols (EVOH), and styrenic resins. Functonalized polyolefins means polyolefins having groups containing polar molar molecules, particularly nitrogen, phosphorus, oxygen, sulfur, and halogens. Preferred styrenic resins are polystyrene and ABS. In a preferred embodiment, the materials incompatible with polyethylene are those resins described as barrier layer materials in the aforementioned U.S. 2002/0051891 A1, U.S. 2002/0176955 A1, U.S. 2003/0175538 A1, U.S. 2003/0198768 A1, and WO 98029245 A2. In a preferred embodiment, the material incompatible with polyethylene is selected from EVOH, polyamides, and mixtures thereof. A particularly advantageous effect is observed when the material incompatible with polyethylene is EVOH.

In an embodiment of a multilayer structure according to the present invention, in addition to the regrind layer and layer having material incompatible with polyethylene, there is a layer comprised of a polyethylene which is preferably HDPE. In a preferred embodiment this polyethylene layer is virgin polyethylene, meaning it has not previously been used in an article. In a more preferable embodiment, this layer comprises virgin HDPE, which may be a homopolymer or copolymer of HDPE. In an embodiment, the layer comprises an HDPE copolymer of ethylene and a $C_3$–$C_{12}$ alpha olefin. In another embodiment, the layer comprised of polyethylene is an alloy of polyethylene with a barrier material, such as Orgalloy™ resin, available from Atofina. In another embodiment the layer comprises a blend of polyethylenes.

In one embodiment, the HDPE polymer may have a melt index from 0.01 to 45 g/10 min, as measured in accordance with ASTM-1238 condition E. In another embodiment, the HDPE has a density of from about greater than 0.940 g/cc to about 0.965 g/cc and an HLMI of from about 3.0 to about 40.0 g/10 min (ASTM D-1238-65T, Condition F). The HDPE polymer may be produced using any conventional polymerization process, such as a solution, a slurry, or a gas-phase process, and a suitable catalyst, such as a chrome catalyst, a Ziegler-Natta catalyst or a metallocene catalyst. It is preferred that the HDPEs used in the blends according to the present invention be produced using Zeigler-Natta catalysts.

Examples of suitable HDPE useful in the present invention include HDPEs available from ExxonMobil Chemical Co., Houston, Tex., under the HD, HDA, HMA, HRA, HRP, HDZ or HYA series or under the trademark PAXON. Examples of HDPE include HYA800, produced in the gas phase, and HDZ222, produced by the stirred slurry process and BA46-055, produced in the slurry loop process, the latter also available from ExxonMobil Chemical Company.

Blends of two or more HDPE polymers and one or more HDPE polymers with one or more non-HDPE polymers are also contemplated.

Non-HDPE polymers include any of the other polyethylene resins set forth herein (e.g., LMDPE) or it may be some other polyolefin such as polypropylene. In an embodiment, this layer excludes polypropylene. In an embodiment, the HDPE layer consists essentially of virgin HDPE. In another embodiment the HDPE layer may be a polyethylene alloy such as Orgalloy™ resin, as previously mentioned, The layer comprising polyethylene may contain a major portion (meaning 50 wt. % or more, based on the weight of this layer) of a resin that is not an HDPE, e.g., one of the other polyethylenes recited herein, such as LMDPE, LLDPE, or VLDPE, or it may contain a minor portion of such resins. It is preferred, however, that in the case of a thermoformed article, that this polyethylene layer consist essentially of polyethylene and preferred that it does not contain regrind.

Additional optional layers include adhesive or tie layers between one or more of the aforementioned layers and also additional layers having different functions, such as those set forth in the prior art described herein, e.g., more than one barrier layer having the same or different properties, more than one regrind layer having the same or different properties, more than one polyethylene layer having the same or different properties, and the like, as would be appreciated by one of ordinary skill in the art in possession of the present disclosure.

The ordering of layers will depend on the desired properties but typically will include: (A) a layer comprising polyethylene, preferably at least one HDPE; (B) a layer comprising a material incompatible with polyethylene; and (C) a layer comprising regrind and at least one material selected from low density metallocene polyethylene according to the present invention. In a preferred embodiment the order will be A/B/C, and typically adhesive layers will be present between each of these layers. It will be understood by one of skill in the art that the conventional description "A/B/C" is shorthand for a layer comprising (A), followed by a layer comprising (B), followed by a layer comprising (C), with the option(s) of additional layers before, after, or between each of the specified layers, or a combination of any two of said options or all three options as contemplated embodiments. In another preferred embodiment there will be a second polyethylene layer (D), which may be the same or different than (A), in the order A/B/C/D. Whether (A) and (D) are the same or different, it is preferred that both comprise at least one material selected from HDPE. An adhesive layer may be present between C and D, or there may be no adhesive layer between C and D. In an embodiment, wherein a container is thermoformed comprising layers A/B/C/D and wherein layer D is an inner layer in contact with a liquid or gas, layers A and D, both comprising HDPE, may be the same or different, and in a preferred embodiment layer A consists essentially of virgin HDPE and layer D consists essentially of Orgalloy™ resin.

It is a particular advantage of the present invention that the addition of the at least one low density metallocene polyethylene increases the amount of regrind that can be used in the final structure. In a preferred embodiment the regrind layer comprises greater than 40 wt. %, or at least about 45 wt. %, or at least about 50 wt. % of the final structure. In one embodiment, which may be a film or sheet or other article shaped by thermoforming or other molding technique, comprising the previously recited structure A/B/C or A/B/C/D, with or without various adhesive layers, the layer (C) comprising regrind and the low density metallocene polyethylene according to the present invention comprises greater than 40 wt. %, or at least 45 wt. %, or at least 50 wt. %, of the entire structure.

An article comprising the regrind and low density polyethylene according to the present invention may be a single layer or multilayer film or sheet, or a more complex article such as a container, for instance a barrier fuel tank, and the like, and it may be formed by any method such as, without limitation, coextrusion, thermoforming, or other molding technique, particularly blow molding. Preferred articles include multilayer films and sheets which may be subsequently formed into some other useful article, containers for liquids or gases, particularly a fuel, and more particularly gasoline, and also the article comprising such a container or film, e.g., an automobile having a barrier fuel tank.

Having thus generally described the present invention, the following specific examples are provided as representative examples and are not intended to limit the invention.

Four low density metallocene polycthylenes (Examples 2–5) were evaluated at levels of 5 and 10% in regrind materials from a typical commercial thermoforming process manufacturing a barrier fuel tank having the structure A/B/C/D, wherein layers A and D consist of virgin HDPE, layer B is a barrier layer consisting of EVOH, and layer C is the regrind layer comprising trim from the process mid having a total EVOH content of approximately 9 wt. %. There is an adhesive layer between layers A and B, and also between layers B and C, the adhesive being Admer™ from Mitsui Chemical, a maleated linear low density polyethylene. Unmodified regrind was also run in the same manner, without compounding, to provide a reference point (Comparative Example 1).

Preparation of Regrind

Samples of trim regrind were reduced to a particle size sufficient to allow operation of the twin screw extruder, compounded with low density metallocene polyethylene according to the present invention and pelletized on the 30 mm ZSK twin screw extruder under standard operating conditions resulting in a melt temperature of 450° F. (about 232° C.). The pellets were then pressed into plagues and tested for impact strength. Impact data was measured according to Gardener Impact Test at room temperature (ASTM D-5420. A dynamic impact test was nerformed usina ASTM D-3763-98 at −40° C. The Gardener Impact Test is a falling dart test, where a dart is dropped from different heights; the height it takes to break the sample is then convened into energy. In the dynamic impact test, the amount of energy it takes to drive a dart through the specimen is measured.

COMPARATIVE EXAMPLE 1

Regrind without the low density metallocenc polyethylene according to the invention was prepared as just described. The Gardener Impact strength of the resulting material was measured according to ASTM D-5420 at 350 in-lb (39.55 Joules).

5 wt. % of Exact™ 8201 polyethylene was added in-line to the regrind, based on the weight of the regrind layer. The Gardener Impact strength of the resulting material was measured at 427 in-lb (48.25 Joules).

10 wt. % of Exact™ 8201 polyethylene was added in-line. The resultant material exhibited a Gardener Impact Strength of 480 in-lb (54.24 Joules).

5 wt. % of Exceed™ 1012 polyethylene was added in-line. The Gardener Impact strength of the resulting material was measured to be 403 in-lb (45.54 Joules).

10 wt. % of Execed™ 1012 polyethylene was added in-line. The Gardener Impact Strength of the resulting material was measured to be 445 in-lb (50.29 Joules).

Additional plaques using regrind and the low density metallocene polyethylenes used in Examples 2–5 were tested using a dynamic impact test or Dyna-tup test according to ASTM D-3763-98 at −40° C. While the dynamic impact strength for each of the samples using the Exceed™ 1012 and Exact™ 8201 polyethylenes showed an improvement over the unmodified regrind (Comparative Example 1), the sample using 10 wt. % Exact™ 8201 was superior to the other samples, having a Gardener Impact strength of approximately 26 Joules. For comparison, using a plaque consisting of virgin HDPE (BA 46-055 HDPE available from ExxonMobil Chemical Company) and tested in the same manner at −40° C. yielded a measurement of approximately 24 Joules.

The present invention is particularly useful in thermoforming processes and other processes involving molding, particularly blow molding, wherein regrind material is used or more generally wherein material comprising plastics is recycled. It is useful in process making articles such as mono- or multilayer webs, mono- or multilayer films and sheets, and combinations of webs, films and sheets, also hollow bodies, for example tubes, bottles and other containers, such as gas tanks, and other useful articles such as automobile bumpers, and the like.

Having described the invention with reference to a general description, a detailed description, and specific examples, the following is yet a further description of some preferred embodiments of the present invention: (I) an article comprising regrind and at least one material selected from low density polyethylenes; and also one or more of the following more preferred embodiments: said article comprising (A) a layer comprising polyethylene; (B) a layer comprising a material incompatible with polyethylene; and (C) a layer comprising regrind and at least one material selected from low density metallocene polyethylenes, particularly wherein said polyethylene in layer (A) is selected from HDPE homopolymer, HDPE copolymer of ethylene and a C3–C12 alpha olefin, and mixtures thereof; wherein any of the aforementioned articles has at least one layer comprising an alloy or blend of polyethylene; and/or wherein any of the aforementioned articles further comprises at least one adhesive layer, preferably wherein said adhesive layer comprises a maleated LLDPE; wherein layer (A) in any of the aforementioned articles comprises, consists essentially of, or consists of an HDPE having a density of from greater than about 0.940 g/cc to about 0.965 g/cc according to ASTM D-4883 and an HLMI of from about 3.0 to about 40.0 according to ASTM D-1238-65T, Condition F; any of the aforementioned articles having a layer comprising material incompatible with polyethylene, wherein said material incompatible with polyethylene is a material comprising a resin selected from ethylene vinyl alcohol, polyamide, polyketone, ethylene vinyl acetate, polyester, and mixtures thereof, particularly wherein said material incompatible with polyethylene is a material comprising a resin selected from ethylene vinyl alcohol, polyamide, and mixtures thereof, even more preferably wherein said material incompatible with polyethylene is ethylene vinyl alcohol; also preferably wherein any of the aforementioned articles the regrind is trim material from an article comprising (A) a layer comprising polyethylene; (B) a layer comprising a material incompatible with polyethylene; (C) regrind and at least one material selected from low density metallocene polyethylene or in another embodiment is trim material comprising polyethylene (preferably HDPE and more preferably HDPE homopolymer), a material incompatible with polyethylene (such as a barrier material as recited herein, particularly EVOH), and a mixture of regrind and at least one low density metallocene polyethylene; and also any of the aforementioned articles having a layer (C) as described herein wherein said at least one material selected from low density metallocene polyethylene plastomer is present in layer (C) in the amount of about 3 wt. % to about 20 wt. %, based on the weight of said layer (C), more preferably wherein said at least one material selected from low density metallocene polyethylene plastomer is present in layer (C) in the amount of about 3 wt. % to about 15 wt. %, based on the weight of said layer (C); or any of the aforementioned articles wherein said at least one material selected from low density metallocene polyethylene is present in layer (C) in an amount sufficient to impart increased impact strength in said article, as measured by Gardener Impact Test at −40° C., or increase the melt strength of said layer or said article, as measure by any known method of measuring melt strength, or increase the amount of recycled material in said article, relative to said layer without said at least one material; or any of the aforementioned articles having a layer (C) as set forth herein wherein layer (C) further comprises a compatibilizer selected from at least one anhydride grafted polyethylene; or any of the aforementioned articles having a layer (A) as set forth herein, further having a layer (D) comprising polyethylene, which may be the same or different from layer (A), particularly such an article having layers (A) through (D) as set forth herein, said article layered in the order of A/B/C/D, more preferably wherein at least one of layers (A) and (D) comprises HDPE, with or without adhesive layers between one or more of the layers, particularly comprising at least one adhesive layer between layer (A) and (B), and between layer (B) and (C); and any of the aforementioned articles having a layer (C) as set forth herein, wherein layer (C) comprises greater than about 40 wt. % of the weight of the entire article, more preferably wherein layer (C) comprises at least about 45 wt. % of the weight of the entire article, still more preferably wherein layer (C) comprises at least about 50 wt. % of the weight of the entire article; and any of the aforementioned formed by or obtainable by a process comprising thermoforming, any of the aforementioned articles formed by or obtainable by a process comprising blow molding. It will be recognized that the article may be a simple single layered sheet or film, a multilayered film or sheet, or a complex article, such as an automotive part, e.g., a fuel tank or other container for solids, liquids or gases. It may be the container per se or it may be the container and a solid, liquid, or gas, e.g., it may be a barrier layer fuel tank with gasoline. The invention also contemplates a useful machine comprising said article, e.g., an automobile comprising the barrier layer fuel tank with or without fuel; (II) a process of making an article including a step of forming a layer comprising regrind, the improvement comprising adding at least one low density polyethylene to said regrind and forming said layer; particularly wherein said at least one low density polyethylene is added in an amount sufficient to increase at least one of the following characteristics of said article: (a) increase the impact strength of said article, as measured by the Gardener Impact Test at either room temperature or at −40° C.; and (b) increasing the amount of regrind in said article on a wt. % basis, or wherein the amount of at least one low density polyethylene is added in an amount sufficient to increase the melt strength of said regrind; preferably any of the aforementioned processes wherein said regrind further comprises a material incompatible with polyethylene; preferably any of the aforementioned processes further comprising a step of thermoforming an article comprising said layer comprising regrind and at least one layer selected from (a) a layer comprising virgin polyolefin; and (b) a layer comprising a material incompatible with polyethylene; (III) a thermoforming process comprising making an article including: (A) a layer comprising polyethylene; (B) a layer comprising a material incompatible with polyethylene; and (C) a layer comprising regrind; the improvement comprising adding at least one material selected from low density metallocene polyethylenes to said layer comprising regrind and thermoforming said article; preferably said process further comprising removing trim from said article and recycling said trim as regrind in layer (C) in said process; preferably any of the aforementioned processes wherein said process generates trim that is substantially entirely reused in said process; and (IV) a container, preferably a barrier layer fuel tank, comprising regrind layer said regrind layer comprising greater than 40 wt. %, or at least about 45 wt. %, or at least about 50 wt. % of said container, and having, in preferred embodiments, any one or more of the features contemplated as preferred embodiments set forth in (I) of this paragraph, or such a container (particularly a barrier layer fuel tank) made by any of the processes set forth in (II) or (III) of this paragraph.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. Many variations will suggest themselves to those skilled in this art in light of the above detailed description. All such obvious variations are within the full intended scope of the appended claims.

Trade names used herein are indicated by a ™ symbol or ® symbol, indicating that the names may be protected by certain trademark rights, e.g., they may be registered trademarks in various jurisdictions. All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted. When numerical lower limits and numerical upper limits are listed herein, ranges from any lower limit to any upper limit are contemplated.

What is claimed is:

1. An article comprising:
   (A) at least one first layer comprising a first polyethylene;
   (B) at least one second layer comprising a material incompatible with polyethylene; and
   (C) at least one third layer comprising a second polyethylene comprising at least one low density metallocene polyethylene and a regrind comprising:
   the first polyethylene;
   the material incompatible with polyethylene; and
   the low density metallocene polyethylene.

2. The article of claim 1 wherein said first polyethylene is selected from HDPE homopolymer, HDPE copolymer of ethylene and a C3–C11 alpha olefin, and mixtures thereof.

3. The article of claim 1 wherein said at least one first layer comprising polyethylene comprises an alloy or blend comprising polyethylene.

4. The article of claim 1 further comprising at least one adhesive tie layer.

5. The article of claim 1 wherein said first polyethylene is an HDPE having a density of from greater than about 0.940 g/cc to about 0.965 g/cc according to ASTM D-4883 and an HLMI of from about 3.0 to about 40.0 according to ASTM D-1238-65T, Condition F.

6. The article of claim 1 wherein said material incompatible with polyethylene is a material comprising a resin selected from ethylene vinyl alcohol copolymer, polyamide, polyketone, ethylene vinyl acetate copolymer, polyester, and mixtures thereof.

7. The ankle of claim 1 wherein said material incompatible with polyethylene is a material comprising a resin selected from ethylene vinyl alcohol copolymer, polyamide, and mixtures thereof.

8. The article of claim 1 wherein said material incompatible with polyethylene is ethylene vinyl alcohol copolymer.

9. The article of claim 1 wherein said regrind further comprises an adhesive.

10. The article of claim 1 wherein said at least one low density metallocene polyethylene comprises a plastomer having a density less than 0.916 g/cm$^3$ present in layer (C) in the amount of about 3 wt. % to about 20 wt. %, based on the weight of said layer (C).

11. The article of claim 1 wherein said at least one low density metallocene polyethylene comprises aplastomer having a density less than 0.916 g/cm$^3$ present in layer (C) in the amount of about 3 wt. % to about 15 wt. %, based on the weight of said layer (C).

12. The article of claim 1 wherein said at least one low density metallocene polyethylene is present in layer (C) in an amount sufficient to impart increased impact strength in said article, as measured by Gardener Impact Test at −40° C., relative to said layer without said at least one low density metallocene polyethylene.

13. The article of claim 1 wherein layer (C) fiarther comprises a compatibilizer comprising at least one anhydride grafted polyethylene.

14. The article of claim 1 further comprising an additional layer (D) comprising polyethylene, which may be the same as or different from layer (A).

15. The article of claim 14 wherein said article is layered in the order of A/B/C/D).

16. The article of claim 15 wherein at least one of layers (A) and (D) comprises HDPE.

17. The article of claim 15 further comprising at least one adhesive layer between layers (A) and (B) or between layers (B) and (C), or both.

18. The article of claim 17 formed by a process comprising thermoforming.

19. The article of claim 1 wherein layer (C) comprises greater than about 40 wt % of the entire article.

20. The article of claim 1 wherein layer (C) comprises at least about 45 wt % of the entire article.

21. The article of claim 1 wherein layer (C) comprises at least about 50 wt. % of the entire article.

22. The article of claim 1 formed by a process comprising thermoforming.

23. The article of claim 1 formed by a process comprising blow molding.

24. The article of claim 1 wherein said article is a film or article shaped by thermoforming.

25. A process for forming a thermoformed article comprising:
    processing an article having at least one layer comprising virgin polyethylene and at least one layer comprising a material incompatible with polyethylene;
    removing trim from the article;
    collecting the trim to provide regrind comprising at least a portion of the virgin polyethylene and at least a portion of the material incompatible with polyethylene; and
    providing a regrind layer on the at least one layer comprising virgin polyethylene or the at least one layer comprising a material incompatible with polyethylene, the regrind layer comprising the regrind and at least one low density metallocene polyethylene in an amount sufficient to increase the impact strength of said article, as measured by the Gardner Impact Test at either room temperature or at −40° C.; and
    thermoforming the article from the at least one layer comprising virgin polyethylene, the at least one layer comprising a material incompatible with polyethylene, and the regrind layer.

26. In a thermoforming process comprising making an article and producing regrind, said article including:
    (A) a layer comprising polyethylene;
    (B) a layer comprising a material incompatible with polyethylene; and
    (C) a layer comprising regrind, the regrind comprising at least a portion of the polyethylene, and at least a portion of the material incompatible with polyethylene;
    the improvement comprising adding at least one low density metallocene polyethylene to said layer comprising the regrind; and
    thermoforming said article.

27. The thermoforming process of claim 26 further comprising removing trim from said article and recycling said trim as regrind in layer (C) in said process.

28. The thermoforming process of claim 26 wherein said process generates trim that is substantially entirely reused in said process.

29. An article comprising a layer (A) comprising polyethylene, a layer (B) comprising a material incompatible with polyethylene; and a layer (C) comprising regrind and at least one low density metallocene polyethylene, the regrind comprising:
    at least a portion of the polyethylene layer (A); and
    at least a portion of the material incompatible with polyethylene in layer (B);
    wherein said layer (C) comprises greater than about 40 wt % of the entire article.

30. The article of claim 29 wherein said layer (C) comprises greater than about 45 wt. % of the entire article.

31. The article of claim 30 wherein said layer (C) comprises greater than about 50 wt. % of the entire article.

32. An article comprising a layer (A) comprising polyethylene, a layer (B) comprising a material incompatible with polyethylene, and a layer (C) comprising HDPE, at least one low density metallocene polyethylene and regrind, the regrind comprising:
    at least a portion of the polyethylene in layer (A); and
    at least a portion of the material incompatible with polyethylene in layer (B);
    wherein said layer (C) comprises greater than about 40 wt. % of said article.

* * * * *